(12) United States Patent
Baxter et al.

(10) Patent No.: US 11,173,426 B2
(45) Date of Patent: Nov. 16, 2021

(54) METHOD FOR SOLID-LIQUID SEPARATIONS

(71) Applicant: Sustainable Energy Solutions, Inc., Provo, UT (US)

(72) Inventors: Larry Baxter, Orem, UT (US); David Frankman, Provo, UT (US); Skyler Chamberlain, Provo, UT (US); Nathan Davis, Bountiful, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 615 days.

(21) Appl. No.: 15/852,801

(22) Filed: Dec. 22, 2017

(65) Prior Publication Data
US 2019/0192999 A1    Jun. 27, 2019

(51) Int. Cl.
| *B01D 21/24* | (2006.01) |
| *B01D 21/00* | (2006.01) |
| *B01D 17/02* | (2006.01) |
| *F25D 3/12*  | (2006.01) |
| *F25D 3/10*  | (2006.01) |

(52) U.S. Cl.
CPC ..... *B01D 21/2461* (2013.01); *B01D 17/0214* (2013.01); *B01D 21/009* (2013.01); *F25D 3/10* (2013.01); *F25D 3/12* (2013.01)

(58) Field of Classification Search
USPC ....... 62/617; 95/45, 190, 229, 290; 210/179, 210/252, 370, 374, 767, 768, 808; 422/187
See application file for complete search history.

(56) References Cited

U.S. PATENT DOCUMENTS

| 2011/0186499 A1* | 8/2011 | Czwaluk ............ B30B 9/26 210/225 |
| 2012/0125043 A1* | 5/2012 | Cullinane ............ F25J 3/08 62/620 |

\* cited by examiner

*Primary Examiner* — Hayden Brewster
(74) *Attorney, Agent, or Firm* — Cook Alex Ltd.; R. Blake Johnston

(57) ABSTRACT

Devices, systems, and methods are disclosed to separate solids from liquids. A vessel includes a screw, an inlet, a first outlet, and a second outlet. The inlet receives a first slurry having an incoming solids concentration. The first slurry consists of solids and a contact liquid. The first outlet is disposed toward the first end of the vessel. The second outlet is disposed toward a second end of the vessel. The screw preferentially conveys the solids over the contact liquid towards the second end of the vessel, the solids displacing at least a portion of the contact liquid, causing that portion of the contact liquid to flow toward the first outlet. A melting device is included.

9 Claims, 8 Drawing Sheets

METHOD FOR SOLID-LIQUID SEPARATIONS

GOVERNMENT INTEREST STATEMENT

This invention was made with government support under DE-FE0028697 awarded by the Department of Energy. The government has certain rights in the invention.

FIELD OF THE INVENTION

The devices, systems, and methods described herein relate generally to solid-liquid separations. More particularly, the devices, systems, and methods described herein relate to solid-liquid separations using displacement of liquids by solids.

BACKGROUND

Separations of solids and liquids is a challenge in nearly every industry. The challenge is greatly increased in cryogenic situations, where the solids involved are at extreme low temperatures and sublimate directly to gases at ambient pressures. Solids filtration is complicated by clogging at one extreme, and solids passing through oversized holes on the other extreme.

SUMMARY

Devices, systems, and methods for separating solids from liquids are disclosed. A vessel may include a screw, an inlet, a first outlet, and a second outlet. The inlet may be adapted to receive an incoming slurry comprising solids and a contact liquid. The incoming slurry has an incoming solids concentration. The screw within the vessel may be adapted to rotate so as to convey slurry in a direction from a first end of the vessel toward a second end of the vessel. The first outlet may be disposed toward the first end of the vessel. The second outlet may be disposed toward the second end of the vessel. A melting device may be disposed toward the second end of the vessel, for melting at least a portion of the solids. As the screw conveys the solids preferentially over the contact liquid toward the second end of the vessel, the solids displace at least a portion of the contact liquid, causing that portion of the contact liquid to flow toward the first outlet, thereby producing an inside-vessel slurry which has a lower solids concentrations toward the first end and a higher solids concentration toward the second end.

A portion of the vessel may be cooled by an external cooling device.

The vessel may have a downcomer section disposed toward the second end of the vessel. The downcomer may include the second outlet. The melting device may be disposed along the downcomer section and may melt the solids in the downcomer section, producing a product liquid. The product liquid may be more dense than the contact liquid, thereby displacing at least a portion of the contact liquid from the downcomer section and driving the contact liquid toward the first end of the vessel, thereby decreasing the amount of contact liquid passing out the second outlet.

The contact liquid may include water, hydrocarbons, liquid ammonia, cryogenic liquids, or a combination thereof. The term "cryogenic liquid" is intended to refer to a liquid with a normal boiling point typically below −58° F. (−50° C.). The most commonly used industrial gases that are transported, handled, and stored in the liquid state at cryogenic temperatures are argon, helium, hydrogen, nitrogen, oxygen, and acid gases.

The solids may include water, hydrocarbons, ammonia, solid acid gases, or a combination thereof, and wherein solid acid gases comprise solid forms of carbon dioxide, nitrogen oxide, sulfur dioxide, nitrogen dioxide, sulfur trioxide, hydrogen sulfide, or a combination thereof.

The screw may at least partially compress the solids, resulting in the solids in the top portion of the downcomer section having a second average particle size, the second average particle size being larger than the first average particle size. A solids-recycle outlet may be adjacent to a top portion of the downcomer and direct a portion of the solids from the top portion of the downcomer section to the inlet.

The screw may be oriented horizontally, vertically, or in between horizontally and vertically. Preferably, the screw is oriented horizontally. The screw may be notched to facilitate backflow of the contact liquid.

The inlet may be disposed adjacent to the vessel where the spectrum of solids concentrations of the inside-vessel slurry substantially matches the first solids concentration of the first slurry.

The screw may be notched, the notches being set in intervals along a length of the screw and consisting of gaps in a thread of the screw from an outside edge of the thread to an outside edge of the shaft of the screw.

BRIEF DESCRIPTION OF THE DRAWINGS

In order that the advantages of the described devices, systems, and methods will be readily understood, a more particular description of the described devices, systems, and methods briefly described above will be rendered by reference to specific embodiments illustrated in the appended drawings. Understanding that these drawings depict only typical embodiments of the described devices, systems, and methods and are not therefore to be considered limiting of its scope, the devices, systems, and methods will be described and explained with additional specificity and detail through use of the accompanying drawings, in which.

DETAILED DESCRIPTION

It will be readily understood that the components of the described devices, systems, and methods, as generally described and illustrated in the Figures herein, could be arranged and designed in a wide variety of different configurations. Thus, the following more detailed description of the embodiments of the described devices, systems, and methods, as represented in the Figures, is not intended to limit the scope of the described devices, systems, and methods, as claimed, but is merely representative of certain examples of presently contemplated embodiments in accordance with the described devices, systems, and methods.

The terms "screw" or "screw conveyor" refer to a screw conveyor, screw press, auger, auger conveyor, or auger press. The terms "fused" also includes the effects of sintering.

Many cryogenic solids act in ways seemingly contradictory to what we expect from solids. Normally, solids melt into a liquid, which then vaporize into a gas. Many cryogenic liquids, such as carbon dioxide and other acid gases, have phase diagrams that, at ambient pressures, will sublimate from solid directly to gas. In materials handling, liquids are simple to transport when compared to both solids and gases. Gases require large equipment to transport similar masses in comparison to liquid. Solids have to be moved by conveyance devices that are, with only a few exceptions, open to ambient pressures. The devices, systems, and methods disclosed herein overcome these challenges and others by taking advantage of the greater tendency of solids to adhere to other solids than liquids to adhere to other solids. A screw conveyor moves solids by rotating a screw, forcing the solids forward. However, a slurry has a combination of a carrier liquid and solids. When the screw turns, the solids adhere better to the wall than the carrier liquid, thereby advancing faster than the carrier liquid. In other words, the solids are preferentially conveyed over the carrier liquid. As liquids are not compressible, the solids being preferentially conveyed means that an equal volume of the carrier liquid is displaced backward, through the vessel. By injecting the slurry into the vessel partway along the screw conveyor, the carrier liquid is able to flow backwards and leave at the beginning of the screw conveyor. The solids are then able to move forward, each preferential movement forward displacing more carrier liquid.

In cases where the liquid form of the solids is denser than the carrier liquid, an additional means of attaining greater separation can be utilized. The solids, along with any remaining carrier liquid, can be melted. into a product liquid. When the product liquid is denser than the carrier liquid, the carrier liquid is displaced upward, thereby providing a further backward driving force to the carrier liquid to pass backward and out of the vessel. In one embodiment, this occurs in a downcomer.

Figure 1:
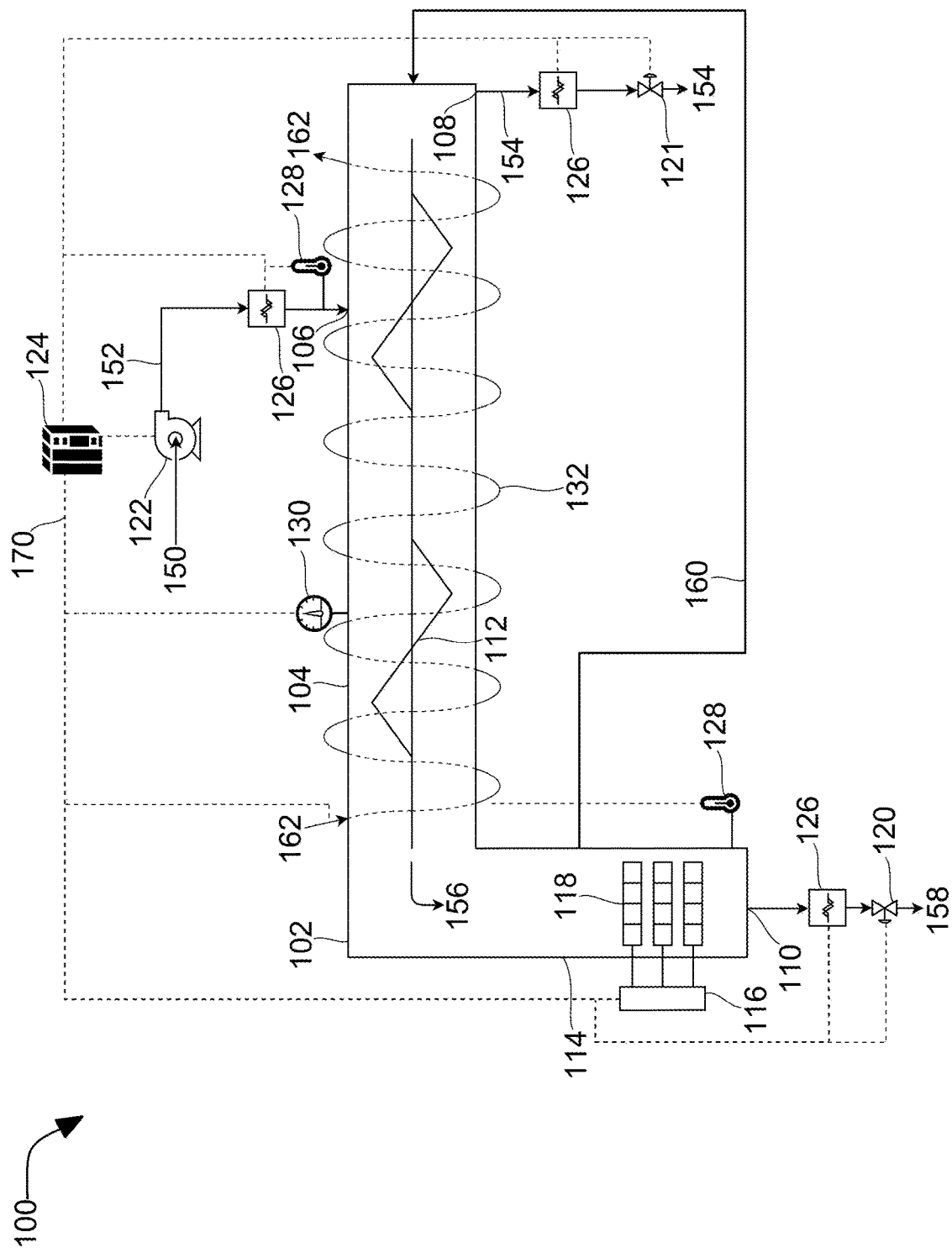
FIG. 1 is a cross-sectional side view of a vessel with a screw conveyor and downcomer.

Referring now to the Figures, FIG. 1 shows a process 100 for separating a solid from a liquid that may be used in the described devices, systems, and methods. A slurry stream 150 comprises solids and a liquid. In this example, the solids are carbon dioxide and the liquids are isopentane. The slurry stream 150 is combined with a solid recycle stream 160 and pumped through pump 122 as feed stream 152. Feed stream 152 passes through flow meter 126 and into vessel 102 through inlet 106. Vessel 102 comprises a screw conveyor section 104 and a downcomer section 114. Once in vessel 102, the feed stream 152 begins to experience solid-liquid separation due to the motion of the screw conveyor 112 through screw conveyor section 104. Screw conveyor 112 advances feed stream 152 towards downcomer section 114, but the carbon dioxide solids present are preferentially conveyed forward over the isopentane liquid. This preferential advancement of the carbon dioxide solids displaces a portion of the isopentane liquid as the carbon dioxide solids advance faster than the isopentane liquids, driving the portion of the isopentane liquids backwards towards first outlet 108. As a result, the slurry stream 150 being conveyed has a lower solids concentration at the first outlet 108 and a higher solids concentration at the second outlet 110. The screw conveyor section 104 is cooled by an external cooling device 132. In this example, the cooling element is a coiled tube that carries a liquid nitrogen coolant 162.

This displacement effect is further enhanced as the thickened slurry stream 156 leaves screw conveyor section 104 and enters downcomer 114 of vessel 102. A heater 116 heats up resistive heating elements 118, melting the carbon dioxide solids into a carbon dioxide liquid. The vessel 102 is maintained at or above the pressure at which carbon dioxide solids melt when heated to produce carbon dioxide liquids. The carbon dioxide liquid further separates from the isopentane as the two liquid densities are different and so separate into layers. This separation results in a carbon dioxide liquid product stream 158 being removed from downcomer 114 through control valve 120. The isopentane liquid is further driven towards the first outlet 108 by this separation of liquid constituents in the downcomer 114, resulting in a isopentane liquid product stream 154 being removed through first outlet 108. In some embodiments, the separation results in substantially pure carbon dioxide. In this example, "substantially all" for pure carbon dioxide may be at least 95 wt % preferably at least 99 wt %, and most preferably at least 99.3 wt %.

In this example, the screw conveyor 112 and the screw conveyor section 104 taper to a narrower diameter adjacent to the downcomer. By tapering, the screw conveyor 112 pressurizes the feed stream 152 as it passes through the vessel 102, resulting in at least a portion of the carbon dioxide solids fusing into larger particles. A portion of the thickened slurry stream 156 is recycled as the solid recycle stream 160, as described above, in order to provide larger particles to assist with producing fused particles and to drag smaller particles forward in the vessel 102.

In this example, the process 100 is controlled by controller 124. Flow meters 126, temperature transmitters 128, and a pressure transmitter 130 are distributed at key points in the process to measure their respective process variables and transmit the data to controller 124. Controller 124 then evaluates the data and transmits commands to the pump 122, the heater 116 and the control valves 120 and 121, to maintain pressure, temperature, and flow rates at optimal values and produce the substantially pure carbon dioxide liquid product stream 158 and the substantially pure isopentane liquid product stream 154. Dashed lines 170 represent the electronic communications to and from controller 170. In this example, flow meters 126 are placed on inlet 106, first outlet 108, and second outlet 110. Pressure transmitter 130 is placed on the vessel 102. Temperature transmitters 128 are placed on the inlet 106 and the bottom of the downcomer 114. Pump 122 provides pressurized slurry feed into vessel 102, while valves 120 and 121 are controlled to provide a backpressure against this feed pressure.

In some embodiments, the liquid is recycled to collect more solids and is returned to the vessel, thus having a less stringent requirement for solids removal. For example, when the liquid is isopentane and the solids are carbon dioxide, the isopentane removed would be cooled and used to desublimate further carbon dioxide to form the solids. As such, dissolved carbon dioxide contaminants or some solid carbon dioxide in the isopentane would be acceptable. In some embodiments, substantially all of the carrier liquid is removed through the carrier liquid outlet, resulting in a substantially pure carbon dioxide product liquid. Substantially pure would be at least 95 wt %, more preferably 99 wt %, and most preferably 99.3 wt % carbon dioxide.

Figure 2:
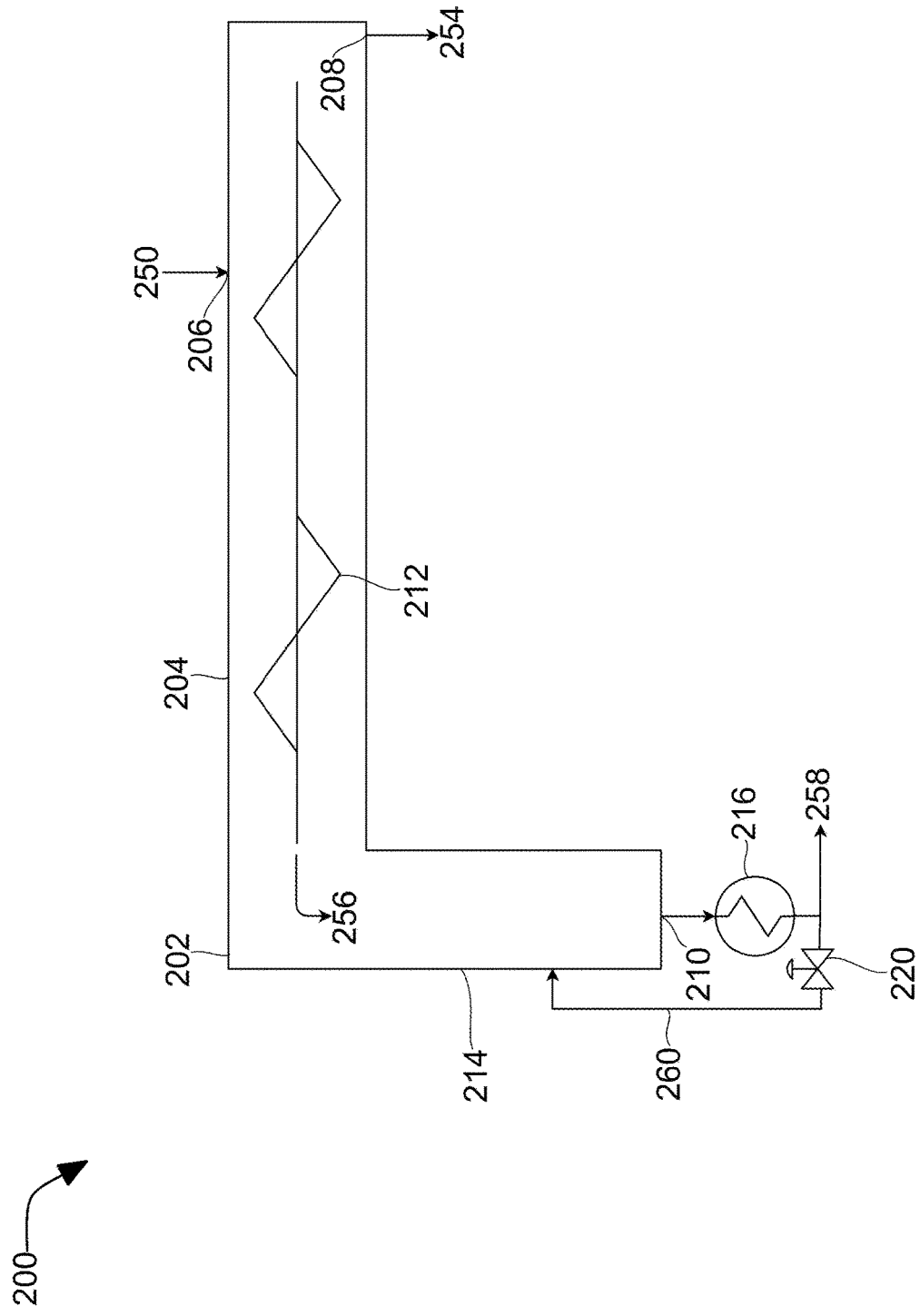
FIG. 2 is a cross-sectional side view of a vessel with a screw conveyor.

Referring now to FIG. 2, FIG. 2 shows a process 200 for separating a solid from a contact liquid that may be used in the described devices, systems, and methods. Slurry stream 250 (e.g., 150) comprises solids and a contact liquid. The contact liquid entrains the solids. In some embodiments, such as when carbon dioxide is the solid and isopentane is the liquid, the isopentane, at cryogenic temperatures had contacted a carbon dioxide containing gas stream and desublimated the carbon dioxide into the isopentane, forming the slurry. Slurry stream 250 passes through an inlet 206 (e.g., 106) into a vessel 202 (e.g., 102). Vessel 202 comprises a screw conveyor section 204 (e.g., 104) and a downcomer section 214 (e.g., 114). Once in vessel 202, the slurry stream 250 begins to experience solid-liquid separation due to the motion of the screw conveyor 212 (e.g., 112) through screw conveyor section 204. Screw conveyor 212 advances slurry stream 250 towards downcomer section 214, but the solids present are preferentially conveyed forward over the liquid. This preferential advancement of the solids displaces a portion of the liquid as the solids advance faster than the liquids, driving the portion of the liquids backwards towards first outlet 108 (e.g., 208). As a result, the slurry stream 250 being conveyed has a lower solids concentration at the first outlet 108 and a higher solids concentration at the second outlet 210. (e.g., 110). This displacement effect is further enhanced as the thickened slurry stream 256 (e.g., 156) leaves screw conveyor section 204 and enters downcomer section 214 of vessel 202. A hot product liquid recycle stream 260 is recycled into a bottom portion of downcomer section 214, melting the solids in the thickened slurry stream 256 into a product liquid. The product liquid further separates from the contact liquid as the two liquid densities are different and so separate into layers. This separation results in a substantially pure product liquid stream 258 (e.g., 158) being removed from downcomer 214 through second outlet 210 (e.g., 110). The product liquid is then further heated in exchanger 216 and a portion of the resultant hot product liquid is recycled to the downcomer 214 as the hot product liquid recycle stream, while the remainder leaves as hot product liquid stream 258. The contact liquid is further driven towards the first outlet 208 by this separation of liquid constituents in the downcomer 214, resulting in a substantially pure contact liquid stream 254 being removed through first outlet 208.

Figure 3:
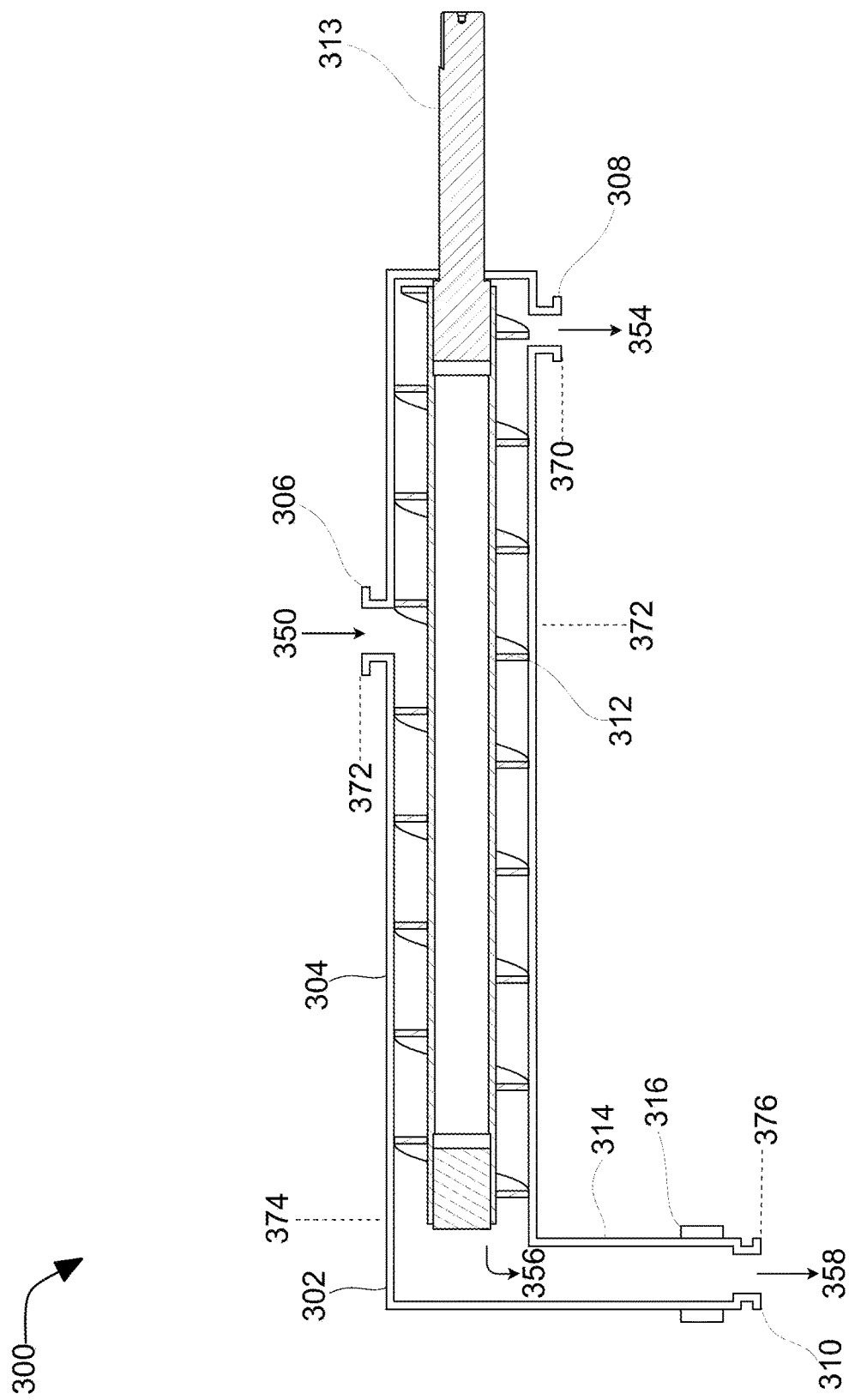
FIG. 3 is a process for separating a solid from a liquid.

Referring now to FIG. 3, FIG. 3 shows a cross-sectional side view 300 of a vessel with a screw conveyor and downcomer that may be used in the described devices, systems, and methods. Vessel 302 (e.g., 102, 202) includes a screw conveyor section 304 (e.g., 104, 204), a downcomer section 314 (e.g., 114, 214), a screw conveyor 312 (e.g., 112, 212) with a shaft 313, an inlet 306 (e.g., 106, 206), a first outlet 308 (e.g., 108, 208), a second outlet 310 (e.g., 110, 210), and a strap-on heater 316 (e.g., 116, 216). The screw conveyor 312 passes through the screw conveyor section 304 of the vessel 302. The screw conveyor has a first end adjacent to the first outlet 308 and a second end adjacent to the beginning of the downcomer section 310. The first outlet 308 is disposed adjacent to the first end of the vessel 302. The second outlet 310 is disposed adjacent to a second end of the vessel 302. Strap-on heater 316 is attached to a bottom portion of the downcomer section 314. The inlet 306 is disposed between the first end of the screw 312 and the second end of the screw 312.

The inlet 306 receives a slurry stream 350 (e.g., 150, 250) having a first solids concentration 372. The slurry stream 350 consists of solids and a contact liquid. Once in vessel 302, the slurry stream 350 begins to experience solid-liquid separation due to the motion of the screw conveyor 312 through screw conveyor section 304. Screw conveyor 312 advances slurry stream 350 towards downcomer section 314, but the solids present are preferentially conveyed forward over the liquid. This preferential advancement of the solids displaces a portion of the liquid as the solids advance faster than the liquids, driving the portion of the liquids backwards towards first outlet 308. As a result, the slurry stream 350 being conveyed has a lower solids concentration 370 at the first outlet 308 and a higher solids concentration 376 at the beginning of the downcomer section 314. This displacement effect is further enhanced as the thickened slurry stream 356 (e.g., 156, 256) leaves screw conveyor section 304 and enters downcomer section 314 of vessel 302. The strap-on heater 316 melts the solids in the thickened slurry stream 356 into a product liquid. The product liquid further separates from the contact liquid as the two liquid densities are different and so separate into layers. This separation results in a substantially pure 376 product liquid stream 358 (e.g., 158, 258) being removed from downcomer 314 through second outlet 310. The contact liquid is further driven towards the first outlet 308 by this separation of liquid constituents in the downcomer 314, resulting in a substantially pure 370 contact liquid stream 354 (e.g., 154, 254) being removed through first outlet 308.

In some embodiments, the inlet 306 is disposed adjacent to the vessel 302 where the spectrum of solids concentrations of the slurry inside the vessel substantially matches the first solids concentration 372 of the slurry stream 350. In other words, the inlet 306 is ideally located where the concentration of solids in the incoming slurry stream 350 is the same as the concentration of solids in the vessel 302.

In some embodiments, a plunger is used between the screw conveyor section and the downcomer section to meter solids in and maintain backpressure in the screw conveyor section.

Figure 4:
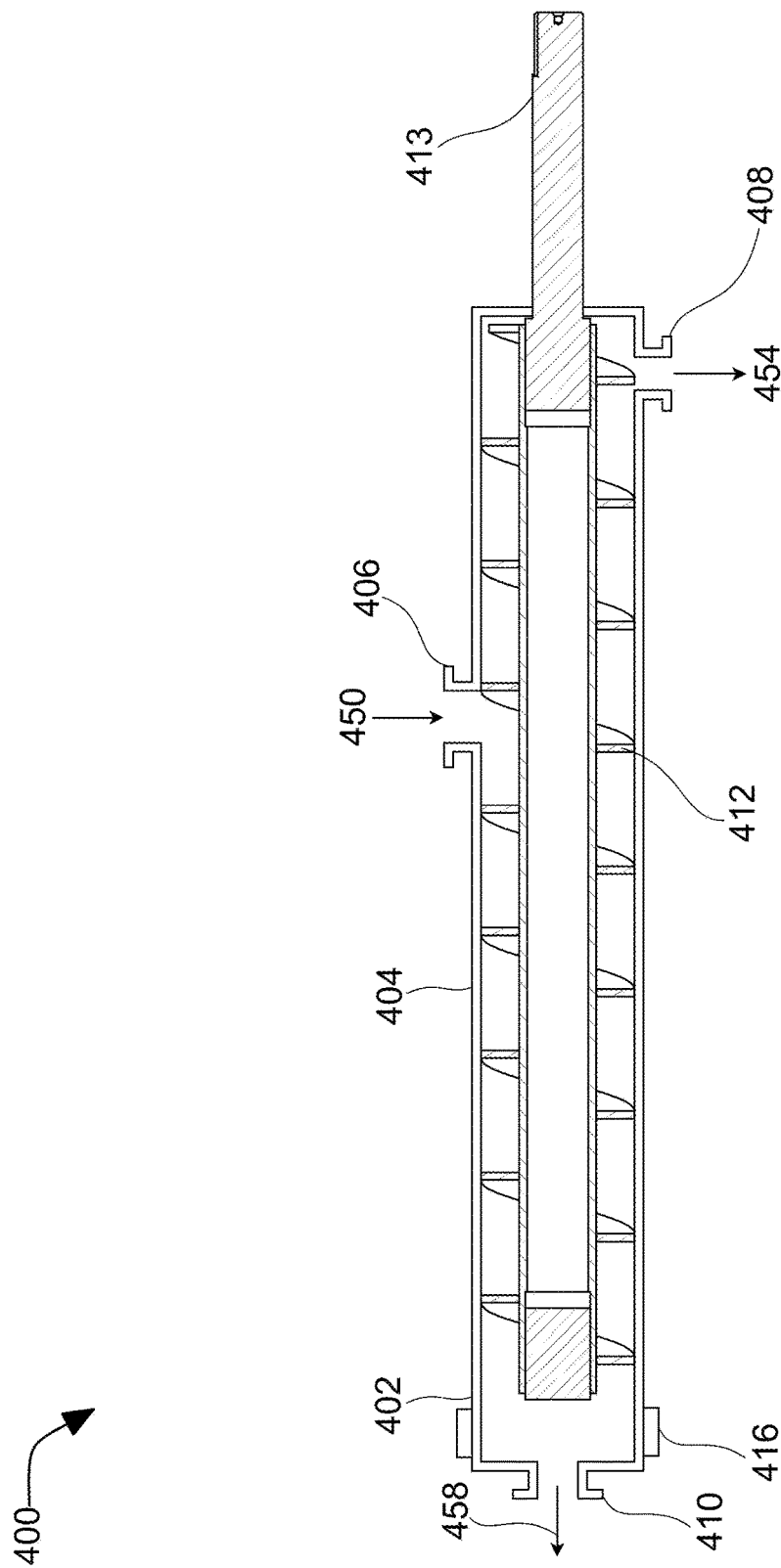
FIG. 4 is a process for separating a solid from a liquid.

Referring now to FIG. 4, FIG. 4 shows a cross-sectional side view of a vessel with a screw conveyor that may be used in the described devices, systems, and methods. Vessel 402 (e.g., 102, 202, 302) includes a screw conveyor section 404 (e.g., 104, 204, 304), a screw conveyor 412 (e.g., 112, 212, 312) with a shaft 413 (e.g., 313), an inlet 406 (e.g., 106, 206, 306), a first outlet 408 (e.g., 108, 208, 308), and a second outlet 410 (e.g., 110, 210, 310). The screw conveyor 412 passes through the screw conveyor section 404 of the vessel 402. The screw conveyor has a first end adjacent to the first outlet 408 and a second end adjacent to the second outlet 410. The first outlet 408 is disposed adjacent to the first end of the vessel 402. The second outlet 410 is disposed adjacent to a second end of the vessel 402. The inlet 406 is disposed between the first end of the screw 412 and the second end of the screw 412.

The inlet 406 receives a slurry stream 450 (e.g., 150, 250, 350) having a first solids concentration. The slurry stream 450 consists of solids and a contact liquid. Once in vessel 402, the slurry stream 450 begins to experience solid-liquid separation due to the motion of the screw conveyor 412 through screw conveyor section 404. Screw conveyor 412 advances slurry stream 450 towards second outlet 410, but the solids present are preferentially conveyed forward over the liquid. This preferential advancement of the solids displaces a portion of the liquid as the solids advance faster than the liquids, driving the portion of the liquids backwards towards first outlet 408. As a result, the slurry being conveyed has a spectrum of solids concentrations. These range from the contact liquid product stream 454 (e.g., 154, 254, 354), with substantially no solids leaving the first outlet 408, to product stream 458 (e.g., 158, 258, 358), with reduced or substantially no contact liquid leaving the second outlet 410. The product stream 458 is melted before leaving the first outlet 408 by melting device 416.

Figure 5:
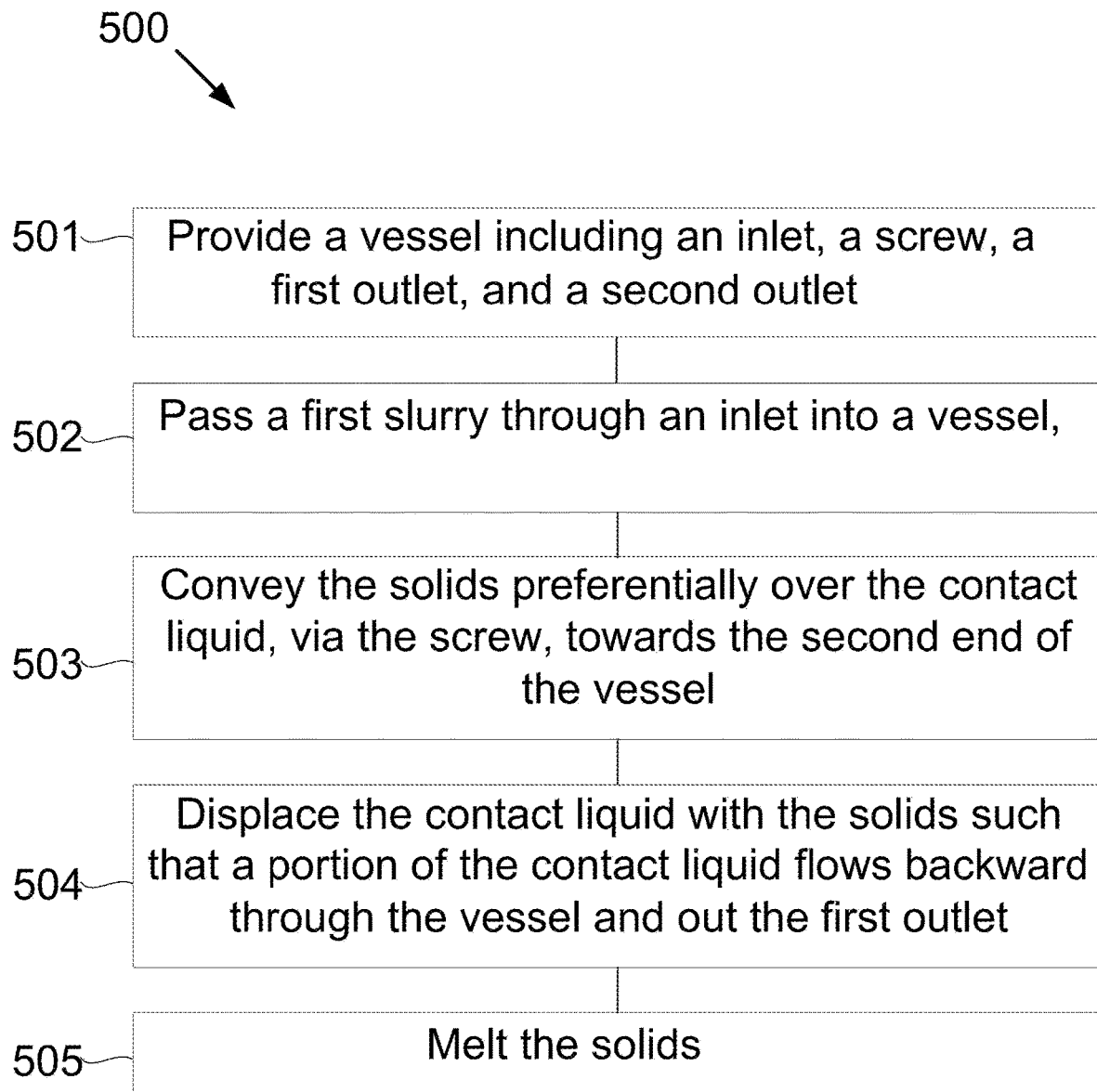
FIG. 5 is a method for separating a solid from a liquid.

Referring now to FIG. 5, FIG. 5 shows a method 500 for separating a solid from a liquid that may be used in the described devices, systems, and methods. At 501, a vessel is provided which includes an inlet, a screw adapted to rotate so as to convey material, a first outlet disposed toward the first end of the vessel, and a second outlet disposed toward a second end of the vessel. At 502, an incoming slurry is passed through an inlet into the vessel. The first slurry has an incoming solids concentration and consists of solids and a contact liquid. At 503, the solids are preferentially conveyed, via the screw, towards the second end of the vessel. At 504, the solids displace the contact liquid such that a portion of the contact liquid flows backward through the vessel and out the first outlet, producing an inside-vessel slurry which has a lower solids concentration toward the first end and a higher solids concentration toward the second end. At 504, the solids are melted at the second end of the vessel with a melting device.

Figure 6:
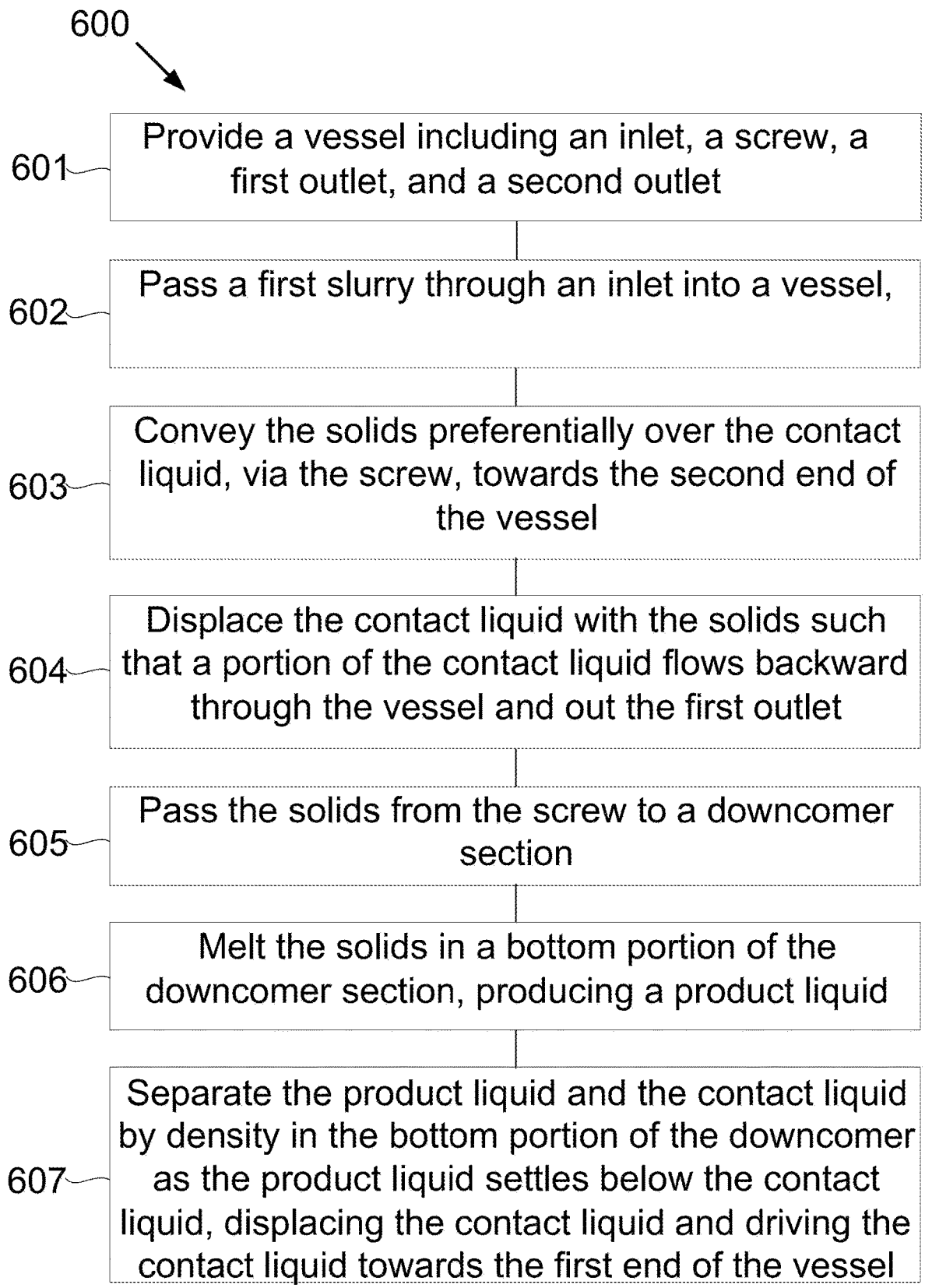
FIG. 6 is a method for separating a solid from a liquid.

Referring now to FIG. 6, FIG. 6 shows a method for separating a solid from a liquid that may be used in the described devices, systems, and methods. At 601, a vessel is provided which includes an inlet, a screw adapted to rotate so as to convey material, a first outlet disposed toward the first end of the vessel, and a downcomer section disposed toward a second end of the vessel. The downcomer section includes a second outlet and a melting device. At 602, an incoming slurry is passed through an inlet into the vessel. The first slurry has an incoming solids concentration and consists of solids and a contact liquid. At 603, the solids are preferentially conveyed, via the screw, towards the second end of the vessel. At 604, the solids displace the contact liquid such that a portion of the contact liquid flows backward through the vessel and out the first outlet, producing an inside-vessel slurry which has a lower solids concentration toward the first end and a higher solids concentration toward the second end. At 605, the solids pass from the screw to a downcomer section. At 606, the solids are melted in the downcomer section, producing a product liquid. At 607, the product liquid and the contact liquid are separated by density in the bottom portion of the downcomer as the product liquid settles below the contact liquid, thereby displacing the contact liquid further and driving the contact liquid towards the first end of the vessel, such that substantially only the product liquid passes out the second outlet.

Figure 7:
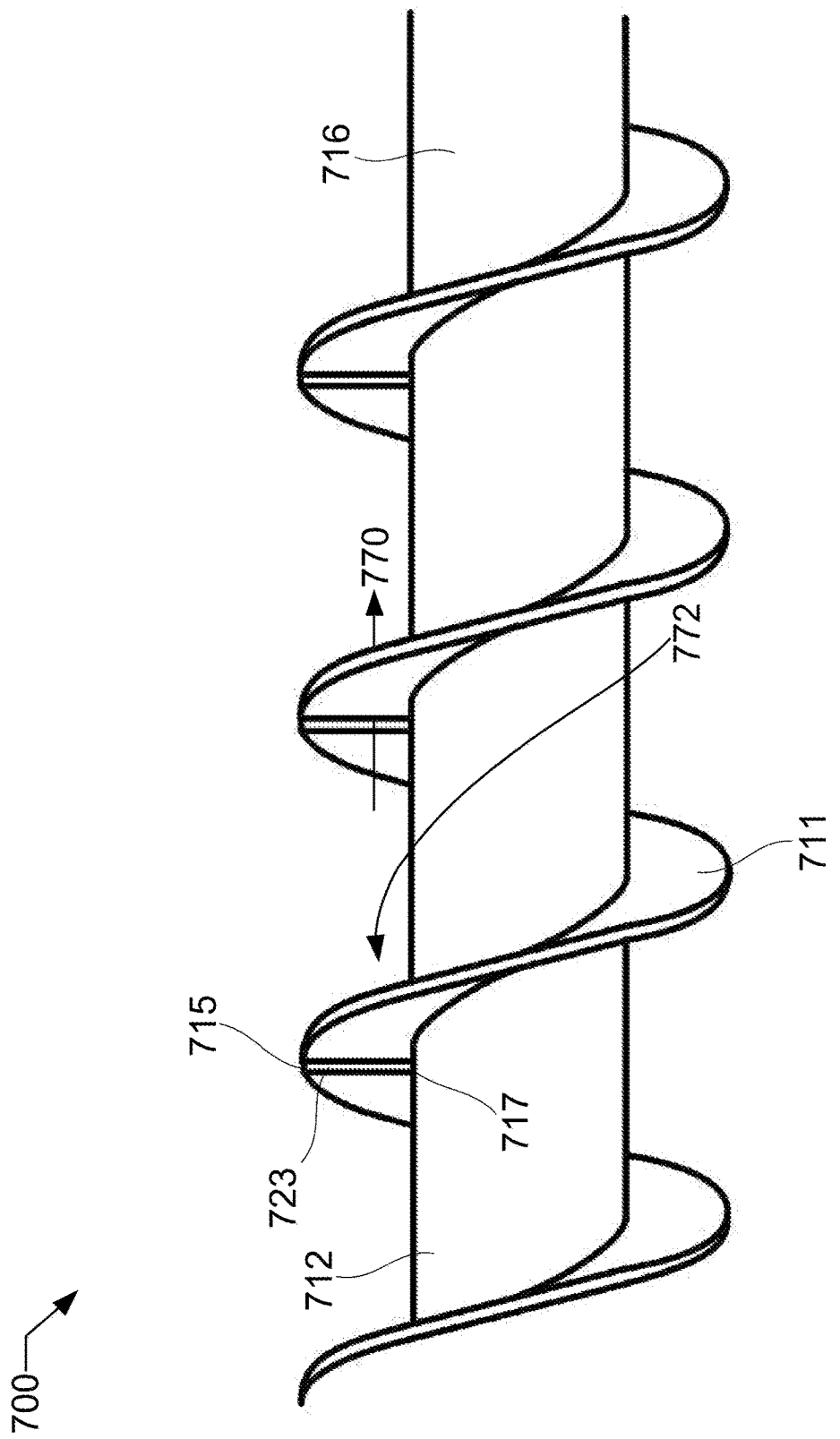
FIG. 7 is a close-up isometric view of a screw.

Referring to FIG. 7, FIG. 7 shows a close-up isometric view of a screw that may be used as the screw conveyor in FIGS. 1-6. Screw conveyor 712 (e.g., 112, 212, 312, 412) is notched at regular intervals. Notches 713 are provided so that, as solids 772 are scraped from the interior walls of vessel 702 (e.g., 102, 202, 302, 402) and are advanced by the screw 712, the contact liquid 770 can still be displaced back by the solids 772 as the solids 772 are pushed forward, even if solids 772 block most of the space between screw 712 and the vessel. Notches 713 run from the outside edge 715 of threads 711 to the outside edge 717 of shaft 716 (e.g. 316, 416).

Figure 8:
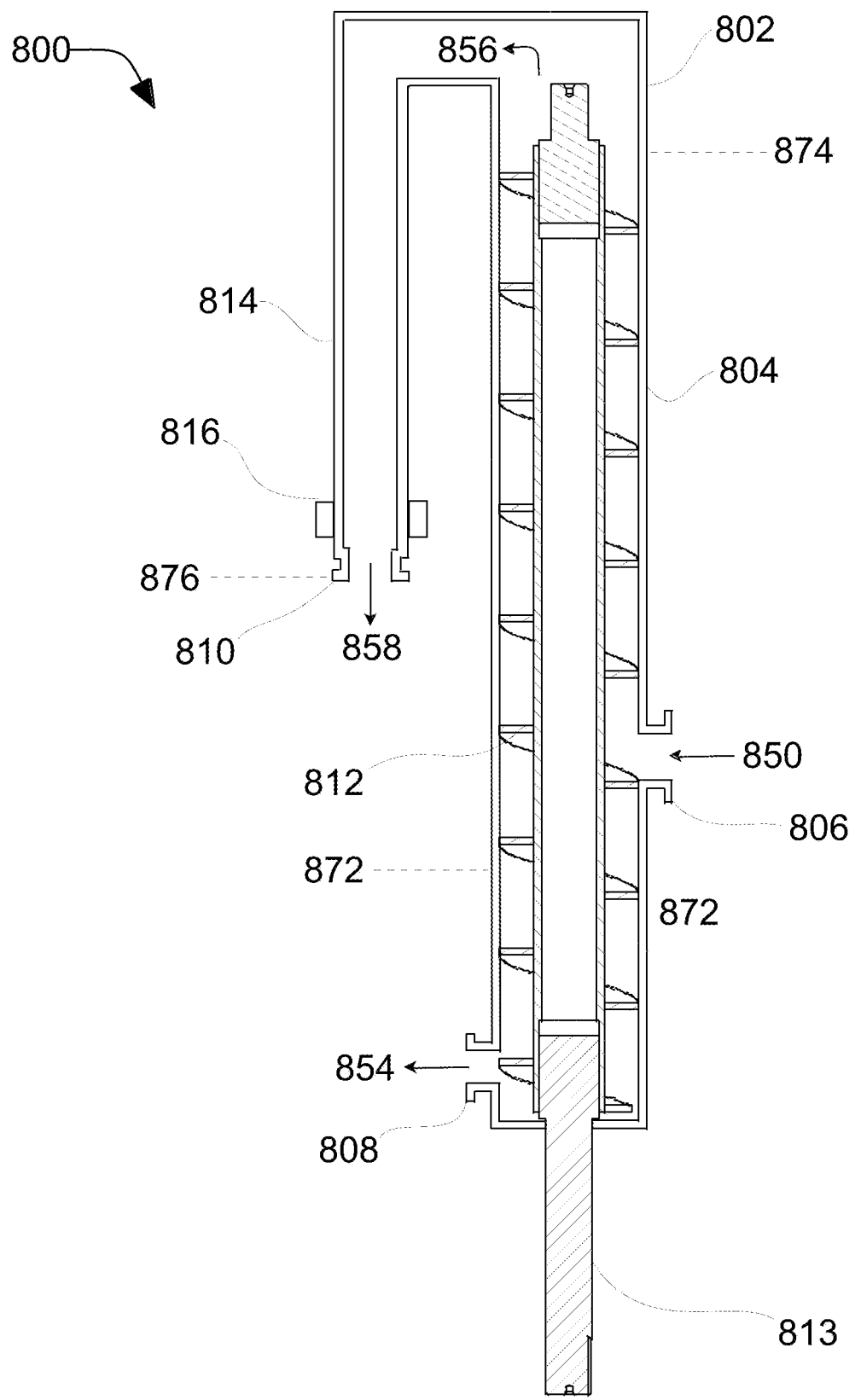
FIG. 8 is a cross-sectional side view of a vessel with a screw conveyor and downcomer.

Referring now to FIG. 8, FIG. 8 shows a cross-sectional side view 800 of a vessel with a vertical screw conveyor and a downcomer that may be used in the described devices, systems, and methods. Vessel 802 (e.g., 102, 202, 302, 402) includes a vertical screw conveyor section 804 (e.g., 104, 204, 304, 404), a downcomer section 814 (e.g., 114, 214, 314, 414), a vertical screw conveyor 812 (e.g., 112, 212, 312, 412) with a shaft 813 (e.g., 313), an inlet 806 (e.g., 106, 206, 306, 406), a first outlet 808 (e.g., 108, 208, 308, 408), a second outlet 810 (e.g., 110, 210, 310, 410), and a strap-on heater 816 (e.g., 116, 216, 316, 416). The vertical screw conveyor 812 passes through the vertical screw conveyor section 804 of the vessel 802. The screw conveyor has a first end adjacent to the first outlet 808 and a second end adjacent to the beginning of the downcomer section 810. The first outlet 808 is disposed adjacent to the first end of the vessel 802. The second outlet 810 is disposed adjacent to a second end of the vessel 802. Strap-on heater 816 is attached to a bottom portion of the downcomer section 814. The inlet 806 is disposed between the first end of the screw 812 and the second end of the screw 812.

The inlet 806 receives a slurry stream 850 (e.g., 150, 250, 350, 450) having a first solids concentration 872. The slurry stream 850 consists of solids and a contact liquid. Once in vessel 802, the slurry stream 850 begins to experience solid-liquid separation due to the motion of the vertical screw conveyor 812 through vertical screw conveyor section 804, as well as due to gravity. Vertical screw conveyor 812 advances slurry stream 850 towards downcomer section 814, but the solids present are preferentially conveyed forward over the liquid, especially in this vertical orientation. This preferential advancement of the solids displaces a portion of the liquid as the solids advance faster than the liquids, further driving the portion of the liquids backwards towards first outlet 808. As a result, the slurry stream 850 being conveyed has a lower solids concentration 870 at the first outlet 808 and a higher solids concentration 876 at the beginning of the downcomer section 814. This displacement effect is further enhanced as the thickened slurry stream 856 (e.g., 156, 256, 356, 456) leaves screw conveyor section 804 and enters downcomer section 814 of vessel 802. The strap-on heater 816 melts the solids in the thickened slurry stream 856 into a product liquid. The product liquid further separates from the contact liquid as the two liquid densities are different and so separate into layers. This separation results in a substantially pure 876 product liquid stream 858 (e.g., 158, 258, 358, 458) being removed from downcomer 814 through second outlet 810. The contact liquid is further driven towards the first outlet 808 by this separation of liquid constituents in the downcomer 814, resulting in a substantially pure 870 contact liquid stream 854 (e.g., 154, 254, 354, 454) being removed through first outlet 808.

Preferably, the process is a single unit operation, separating solids from liquids. Alternatively, the process is used as a series of unit operations, with the output of the first unit being the input of the next unit.

In some embodiments, the downcomer section may be perpendicular to the screw. In some embodiments, the screw may be oriented horizontally, vertically, or in between horizontally and vertically.

In some embodiments, the contact liquid may include water, hydrocarbons, liquid ammonia, cryogenic liquids, or a combination thereof. In some embodiments, the solids may include water, hydrocarbons, ammonia, solid acid gases, or a combination thereof. Solid acid gases include solid forms of carbon dioxide, nitrogen oxide, sulfur dioxide, nitrogen dioxide, sulfur trioxide, hydrogen sulfide, or a combination thereof.

In some embodiments, a plurality of vessels with screw conveyors may be used in series to separate solids and liquids in a stepwise manner.

The invention claimed is:

1. A separations method comprising:
   providing a vessel comprising:
   an inlet
   a screw within the vessel and adapted to rotate so as to convey material in a direction from a first end of the vessel toward a second end of the vessel;

a first outlet disposed toward the first end of the vessel, and a second outlet disposed toward the second end of the vessel;

passing an incoming slurry through the inlet into the vessel, wherein the first slurry comprises solids and a contact liquid and has an incoming solids concentration;

conveying the solids, via the screw, toward the second end of the vessel, the solids displacing the contact liquid, such that a portion of the contact liquid flows out the first outlet, and thereby producing a first inside-vessel slurry which has a lower solids concentration toward the first end and a second inside-vessel slurry which has a higher solids concentration toward the second end; and melting the solids of the second inside-vessel slurry at a point toward the second end of the vessel.

2. The method of claim 1, wherein substantially none of the solids pass out of the first outlet.

3. The method of claim 1, wherein substantially none of the contact liquid passes out of the second outlet.

4. The method of claim 1, further comprising:

providing the vessel with a downcomer section disposed toward the second end of the vessel, the downcomer including the second outlet, wherein a melting device is disposed along the downcomer section;

passing the solids from the screw to the downcomer section;

melting the solids in the downcomer section, producing a product liquid, the product liquid being more dense than the contact liquid; and displacing at least a portion of the contact liquid by the product liquid, thereby further driving the contact liquid toward the first end of the vessel, thereby decreasing the amount of contact liquid passing out the second outlet.

5. The method of claim 4, further comprising cooling an external portion of the vessel.

6. The method of claim 5, wherein the contact liquid comprises water, hydrocarbons, liquid ammonia, cryogenic liquids, or a combination thereof.

7. The method of claim 6, wherein the solids comprise water, hydrocarbons, ammonia, solid acid gases, or a combination thereof, and wherein solid acid gases comprise solid forms of carbon dioxide, nitrogen oxide, sulfur dioxide, nitrogen dioxide, sulfur trioxide, hydrogen sulfide, or a combination thereof.

8. The method of claim 7, further comprising at least partially compressing the solids, resulting in an increase in particle size.

9. The method of claim 1, further comprising maintaining the vessel at or above a pressure at which the solids melt to produce the product liquid.

* * * * *